United States Patent
Oyama et al.

(10) Patent No.: US 10,801,572 B2
(45) Date of Patent: *Oct. 13, 2020

(54) METHOD FOR PRODUCING LATEX COMPOSITION

(71) Applicant: ZEON CORPORATION, Tokyo (JP)

(72) Inventors: Fuminari Oyama, Chiyoda-ku (JP); Yasuaki Watanabe, Chiyoda-ku (JP)

(73) Assignee: Zeon Corporation, Tokyo (JP)

( * ) Notice: Subject to any disclaimer, the term of this patent is extended or adjusted under 35 U.S.C. 154(b) by 134 days.

This patent is subject to a terminal disclaimer.

(21) Appl. No.: 16/086,799

(22) PCT Filed: Mar. 16, 2017

(86) PCT No.: PCT/JP2017/010739
§ 371 (c)(1),
(2) Date: Sep. 20, 2018

(87) PCT Pub. No.: WO2017/164078
PCT Pub. Date: Sep. 28, 2017

(65) Prior Publication Data
US 2019/0093724 A1 Mar. 28, 2019

(30) Foreign Application Priority Data

Mar. 23, 2016 (JP) ............................... 2016-058351
Feb. 10, 2017 (JP) ............................... 2017-022876

(51) Int. Cl.
| | |
|---|---|
| *F16D 69/02* | (2006.01) |
| *C08K 3/20* | (2006.01) |
| *C08L 101/00* | (2006.01) |
| *C08J 3/205* | (2006.01) |
| *C08L 15/00* | (2006.01) |
| *C09K 3/14* | (2006.01) |
| *C08K 5/46* | (2006.01) |
| *C08F 236/12* | (2006.01) |

(Continued)

(52) U.S. Cl.
CPC .......... *F16D 69/026* (2013.01); *C08F 236/12* (2013.01); *C08J 3/205* (2013.01); *C08K 5/46* (2013.01); *C08K 5/47* (2013.01); *C08L 9/04* (2013.01); *C08L 15/00* (2013.01); *C08L 101/00* (2013.01); *C09K 3/14* (2013.01); *C08F 2800/20* (2013.01); *C08K 5/0058* (2013.01); *C08K 2201/014* (2013.01); *F16D 2200/006* (2013.01); *F16D 2200/0056* (2013.01); *F16D 2200/0082* (2013.01)

(58) Field of Classification Search
CPC .......... C08J 3/205; C08L 101/00; C08L 9/04; F16D 69/026; F16D 2200/0056; F16D 2200/006; F16D 2200/082; C08F 236/12
See application file for complete search history.

(56) References Cited

U.S. PATENT DOCUMENTS

| 4,593,070 A | 6/1986 | Oyama et al. |
| 4,774,288 A | 9/1988 | Ridland |
| (Continued) | | |

FOREIGN PATENT DOCUMENTS

| JP | S60-184533 A | 9/1985 |
| JP | S61-218636 A | 9/1986 |
| (Continued) | | |

OTHER PUBLICATIONS

Sep. 25, 2018 International Preliminary Report on Patentability issued in International Patent Application No. PCT/JP2017/010738.
Oct. 16, 2019 European Search Report issued in European Patent Application No. 17770119.0.
Oct. 16, 2019 European Search Report issued in European Patent Application No. 17770120.8.

(Continued)

*Primary Examiner* — Sanza L. McClendon
(74) *Attorney, Agent, or Firm* — Oliff PLC

(57) ABSTRACT

A method for producing a composition containing a latex of a nitrile rubber of α,β-ethylenically unsaturated nitrile monomer unit of 8 to 60 wt % content, and an iodine value of 120 or less, an isothiazoline-based compound represented by formula (1), and a benzisothiazoline-based compound represented by formula (2), both in a content of 26 ppm by weight or more to the rubber, wherein adding both compounds to the latex at 2,000 ppm by weight/min or less, at 50° C. or lower, and the compounds in an aqueous state having 0.1 to 40 wt % concentration.

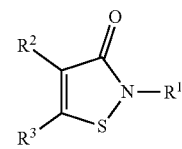

(1)

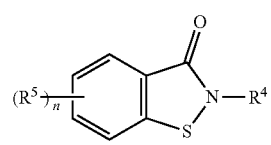

(2)

formula (1), $R^1$ and formula (2), $R^4$ represents a hydrogen atom, or a substituted or unsubstituted organic group; wherein formula (1) $R^2$ and $R^3$ represent a hydrogen atom, a halogen atom, or an substituted organic group; and formula (2), $R^5$ represent a hydrogen atom, or an substituted organic group, and an integer "n" of 0 to 4.

7 Claims, No Drawings

(51) Int. Cl.
C08K 5/47 (2006.01)
C08L 9/04 (2006.01)
C08K 5/00 (2006.01)

(56) References Cited

U.S. PATENT DOCUMENTS

| | | |
|---|---|---|
| 2014/0065336 A1 | 3/2014 | Nakashima et al. |
| 2017/0088700 A1 | 3/2017 | Nakashima et al. |
| 2017/0355854 A1 | 12/2017 | Inoue et al. |
| 2019/0093723 A1* | 3/2019 | Inoue ..................... C08L 61/06 |

FOREIGN PATENT DOCUMENTS

| | | |
|---|---|---|
| JP | S63-142047 A | 6/1988 |
| JP | H06-329834 A | 11/1994 |
| JP | 2005-029679 A | 2/2005 |
| JP | 2005-097474 A | 4/2005 |
| JP | 2005-097475 A | 4/2005 |
| WO | 1998/044039 A1 | 10/1998 |
| WO | 2015/147010 A1 | 10/2015 |
| WO | 2016/104350 A1 | 6/2016 |

OTHER PUBLICATIONS

Jun. 20, 2017 International Search Report issued in International Patent Application No. PCT/JP2017/010738.
Jun. 20, 2017 International Search Report issued in International Patent Application No. PCT/JP2017/010739.
U.S. Appl. No. 16/086,790, filed Sep. 20, 2018 in the name of Sayaka Inoue.
Apr. 30, 2020 Office Action issued in U.S. Appl. No. 16/086,790.

\* cited by examiner

METHOD FOR PRODUCING LATEX COMPOSITION

TECHNICAL FIELD

The present invention relates to a latex composition effectively suppressed in the generation of aggregates and excellent in rotting resistance.

BACKGROUND ART

Latexes of nitrile rubbers containing nitrile monomer units have hitherto been used in a wide variety of applications. For example, such latexes have been used in a wide variety of fields: raw materials of nonwoven fabrics widely used as clothing, industrial materials such as filters and heat insulators, hygienic goods such as masks and white coats, automobile interior materials and air conditioning filters, and the like; compositions for dip forming of nipple, glove, and the like; adhesives between the woven fabrics base-material and rubber members of toothed belts and other various belts for automobiles and industries; adhesives for rubber-reinforcing fibers such as tire cords; fiber processing agent; various binders such as battery binders and paper coating binders; papermaking; paper coating compositions; compositions for modifying resins; foam rubbers; various sealing materials; coating materials; friction materials and the like.

Meanwhile, latexes of nitrile rubbers have hitherto involved problems of decomposition such as generation of unusual odor due to proliferation of fungi during storage after production in storage tanks, or during storage after being filled and shipped in containers, marine containers, drums, and eighteen liter drums; because latexes of nitrile rubbers are used such an extremely wide variety of applications as described above, latexes of nitrile rubbers have chances to be shipped overseas more frequently than hitherto, and have been demanded to have rotting resistance as higher storage stability and preservation stability than hitherto.

Moreover, in the above-mentioned applications, friction materials such as brake lining, disc pad, and clutch facing for automobiles and industrial machines have hitherto used asbestos as the base materials, but there has been demanded in a development of non-asbestos-based friction materials from a viewpoint of the problem of asbestos pollution. At present, there have been developed and used friction materials using fiber base materials such as glass fiber, carbon fiber, aramid fiber, rock wool, ceramic fiber, and various steel fibers as substitute materials for asbestos. The friction materials using such fiber base materials are usually produced by making resin compositions containing thermosetting resins, rubber components and the like attached to or mixing with fiber base materials in order to improve the friction properties and the like.

For example, Patent Document 1 discloses a method for producing a clutch facing wherein a thermosetting resin composition prepared by mixing a rubber component with a thermosetting resin such as a phenolic resin, a urea resin, a melamine resin, or an epoxy resin is attached to the base material fibers, then a binder composition containing a rubber agent is further attached to the base material fibers, and subsequently, the base material fibers are preliminarily famed into a spiral or laminate form, and then the resulting preliminarily famed product is heated and compressed.

However, the clutch facing obtained by the technique of Patent Document 1 is not sufficient in the rotting resistance of the rubber component which is used, and consequently there has been desired an improvement of the rotting resistance of the rubber component. In addition, when an additive such as a preservative is added to the rubber component in a state of a latex in order to improve the rotting resistance of the rubber component, aggregates tend to be generated in the latex, and consequently there has been desired that, when such an additive is added, the generation of the aggregates in the latex is suppressed.

RELATED ART

Patent Documents

Patent Document 1: Japanese Patent Laid-Open No. 61-218636

SUMMARY OF THE INVENTION

Problem to be Solved by the Invention

An object of the present invention is to provide a method for producing a latex composition effectively suppressed in the generation of aggregates, and excellent in rotting resistance.

Means for Solving the Problem

The present inventors engaged in a diligent study to solve the above-mentioned problem to be solved, and consequently have perfected the present invention by discovering that the above object can be achieved by adding a predetermined isothiazoline-based compound and a predetermined benzisothiazoline-based compound, under specific conditions, to a latex of a nitrile rubber containing an $\alpha,\beta$-ethylenically unsaturated nitrile monomer unit in a content of 8 to 60 wt %, and having an iodine value of 120 or less.

That is, the present invention provides a method for producing a latex composition comprising a latex of a nitrile rubber containing an $\alpha,\beta$-ethylenically unsaturated nitrile monomer unit in a content of 8 to 60 wt %, and having an iodine value of 120 or less, an isothiazoline-based compound represented by the following general formula (1) and a benzisothiazoline-based compound represented by the following general formula (2), the content of the isothiazoline-based compound being 26 ppm by weight or more and the content of the benzisothiazoline-based compound being 26 ppm by weight or more, with respect to the nitrile rubber, wherein the method comprises an addition step of adding the isothiazoline-based compound and the benzisothiazoline-based compound being each in a state of an aqueous solution having a concentration of 0.1 to 40 wt % to the latex of the nitrile rubber under the condition that the latex of the nitrile rubber is in a state at a temperature of 50° C. or lower, and the isothiazoline-based compound and the benzisothiazoline-based compound are added in such a way that the addition rate in the addition step is 2,000 ppm by weight/min or less in terms of the total addition rate of the isothiazoline-based compound and the benzisothiazoline-based compound.

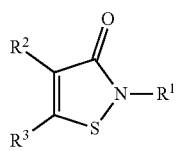

wherein, in the general formula (1), $R^1$ represents a hydrogen atom, or an optionally substituted organic group, and $R^2$ and $R^3$ each independently represent a hydrogen atom, a halogen atom, or an optionally substituted organic group;

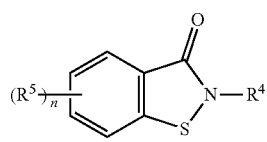

wherein, in the general formula (2), $R^4$ represents a hydrogen atom, or a substituted or unsubstituted organic group, $R^5$ each independently represent a hydrogen atom, or a substituted or unsubstituted organic group, and n represents an integer of 0 to 4.

In the method for producing a latex composition of the present invention, in the addition step, the isothiazoline-based compound and the benzisothiazoline-based compound are preferably added in a state of a composite aqueous solution having a total concentration of the isothiazoline-based compound and the benzisothiazoline-based compound of 0.1 to 40 wt % to the latex of the nitrile rubber.

In the method for producing a latex composition of the present invention, the pH of the latex of the nitrile rubber is preferably less than 12.

In the method for producing a latex composition of the present invention, the nitrile rubber preferably contains a carboxyl group-containing monomer unit.

The present invention provides a method for producing a nitrile rubber composition, comprising a step of coagulating the latex composition obtained by the above-mentioned method.

The present invention provides a method for producing a resin-containing latex composition, comprising a step of mixing the latex composition obtained by the above-mentioned method and a thermosetting resin with each other.

In addition, the present invention provides a method for producing a friction material, comprising a step of making the above-mentioned latex composition attached to or mixed with a base material.

Effects of Invention

According to the present invention, it is possible to provide a method for producing a latex composition effectively suppressed in the generation of aggregates and excellent in rotting resistance.

DESCRIPTION OF EMBODIMENTS

Latex Composition

The method for producing a latex composition of the present invention is a method for providing a latex composition comprising a latex of a nitrile rubber containing an α,β-ethylenically unsaturated nitrile monomer unit in a content of 8 to 60 wt %, and having an iodine value of 120 or less, an isothiazoline-based compound represented by the following general formula (1) and a benzisothiazoline-based compound represented by the following general formula (2), the content of the isothiazoline-based compound being 26 ppm by weight or more and the content of the benzisothiazoline-based compound being 26 ppm by weight or more, with respect to the nitrile rubber, wherein the method comprises an addition step of adding the isothiazoline-based compound and the benzisothiazoline-based compound being each in a state of an aqueous solution having a concentration of 0.1 to 40 wt % to the latex of the nitrile rubber under the condition that the latex of the nitrile rubber is in a state at a temperature of 50° C. or lower, and, the isothiazoline-based compound and the benzisothiazoline-based compound are added in such a way that the addition rate in the addition step is 2,000 ppm by weight/min or less in terms of the total addition rate of the isothiazoline-based compound and the benzisothiazoline-based compound.

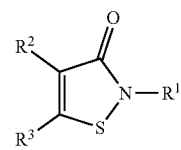

wherein, in the general formula (1), $R^1$ represents a hydrogen atom, or a substituted or unsubstituted organic group, and $R^2$ and $R^3$ each independently represent a hydrogen atom, a halogen atom, or a substituted or unsubstituted organic group.

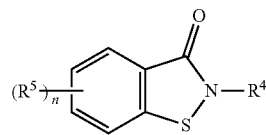

wherein, in the general formula (2), $R^4$ represents a hydrogen atom, or a substituted or unsubstituted organic group, $R^5$ each independently represent a hydrogen atom, or a substituted or unsubstituted organic group, and n represents an integer of 0 to 4.

According to the present invention, by adding the isothiazoline-based compound represented by the general formula (1) and the benzisothiazoline-based compound represented by the general formula (2), being each in a state of an aqueous solution, under the above-mentioned conditions, to the latex of the nitrile rubber containing the α,β-ethylenically unsaturated nitrile monomer unit in a content of 8 to 60 wt %, and having an iodine value of 120 or less, the rotting resistance of the obtained latex composition itself can be improved while the generation of aggregates in the latex composition is being prevented, and moreover, when a friction material is obtained by mixing a thermosetting resin with the aforementioned latex composition, the obtained friction material can be made excellent in rotting resistance.

Hereinafter, first, the latex of a nitrile rubber constituting the latex composition obtained by the production method of the present invention is described. The nitrile rubber constituting the latex used in the present invention is a nitrile rubber containing an α,β-ethylenically unsaturated nitrile monomer unit in a content of 8 to 60 wt %, and having an iodine value of 120 or less.

The nitrile rubber constituting the latex used in the present invention can be obtained, for example, by copolymerizing an α,β-ethylenically unsaturated nitrile monomer and a monomer being copolymerizable with these and used if necessary.

The αβ-ethylenically unsaturated nitrile monomer is, without being particularly limited to, an αβ-ethylenically unsaturated nitrile monomer having preferably 3 to 18 carbon atoms, and particularly preferably 3 to 9 carbon atoms. As specific examples of such a monomer, acrylonitrile, methacrylonitrile, α-chloroacrylonitrile, and the like may be mentioned; among these, acrylonitrile is preferable. These α,β-ethylenically unsaturated nitrile monomers may be used as single types alone or as two or more types combined.

The content of the αβ-ethylenically unsaturated nitrile monomer unit in the nitrile rubber is 8 to 60 wt %, preferably 10 to 60 wt %, more preferably 12 to 58 wt %, and still more preferably 16 to 50 wt %. When the content of the αβ-ethylenically unsaturated nitrile monomer unit is too small, the compatibility (miscibility) of the carboxyl group-containing nitrile rubber is degraded when the carboxyl group-containing nitrile rubber is mixed with a thermosetting resin, and consequently the heat resistance of the obtained friction material is decreased. On the other hand, when the content of the αβ-ethylenically unsaturated nitrile monomer unit is too large, the elasticity and the cold resistance of the obtained friction material are decreased.

In addition, the nitrile rubber constituting the latex used in the present invention is preferably a nitrile rubber prepared by copolymerizing, in addition to an αβ-ethylenically unsaturated nitrile monomer, a carboxyl group-containing monomer from the viewpoint of being capable of more improving the compatibility (miscibility) with a thermosetting resin, the adhesiveness to the base material, and the bending fatigue resistance.

The carboxyl group-containing monomer is not particularly limited so long as the monomer being copolymerizable with the α,β-ethylenically unsaturated nitrile monomer and having one or more unsubstituted carboxyl groups (free carboxyl groups) that is not esterified or the like. By using a carboxyl group-containing monomer, a carboxyl group can be introduced into the nitrile rubber.

As the carboxyl group-containing monomer used in the present invention, an α,β-ethylenically unsaturated monocarboxylic acid monomer, an α,β-ethylenically unsaturated polyvalent carboxylic acid monomer, an α,β-ethylenically unsaturated dicarboxylic acid monoester monomer, and the like may be mentioned. The carboxyl group-containing monomer also includes the monomer in which the carboxyl group of these monomer form a carboxylic acid salt. Moreover, the anhydride of the α,β-ethylenically unsaturated polyvalent carboxylic acid forms a carboxyl group by cleaving the acid anhydride group after copolymerization, and hence can be used as a carboxyl group-containing monomer.

As the α,β-ethylenically unsaturated monocarboxylic acid monomer, acrylic acid, methacrylic acid, ethylacrylic acid, crotonic acid, cinnamic acid, and the like may be mentioned.

As the α,β-ethylenically unsaturated polyvalent carboxylic acid monomer, a butenedioic acid such as fumaric acid and maleic acid; and itaconic acid, citraconic acid, mesaconic acid, glutaconic acid, allylmalonic acid, teraconic acid, and the like may be mentioned. As the anhydride of the α,β-unsaturated polyvalent carboxylic acid, maleic anhydride, itaconic anhydride, citraconic anhydride, and the like may be mentioned.

As the α,β-ethylenically unsaturated dicarboxylic acid monoester monomer, a maleic acid monoalkyl ester such as monomethyl maleate, monoethyl maleate, monopropyl maleate, and mono-n-butyl maleate; a maleic acid monocycloalkyl ester such as monocyclopentyl maleate, monocyclohexyl maleate, and monocycloheptyl maleate; a maleic acid monoalkyl cycloalkyl ester such as monomethyl cyclopentyl maleate and monoethyl cyclohexyl maleate; a fumaric acid monoalkyl ester such as monomethyl fumarate, monoethyl fumarate, monopropyl fumarate, and mono-n-butyl fumarate; a fumaric acid monocycloalkyl ester such as monocyclopentyl fumarate, monocyclohexyl fumarate, and monocycloheptyl fumarate; a fumaric acid monoalkyl cycloalkyl ester such as monomethyl cyclopentyl fumarate and monoethyl cyclohexyl fumarate; a citraconic acid monoalkyl ester such as monomethyl citraconate, monoethyl citraconate, monopropyl citraconate, and mono-n-butyl citraconate; a citraconic acid monocycloalkyl ester such as monocyclopentyl citraconate, monocyclohexyl citraconate, and monocycloheptyl citraconate; a citraconic acid monoalkyl cycloalkyl ester such as monomethyl cyclopentyl citraconate and monoethyl cyclohexyl citraconate; an itaconic acid monoalkyl ester such as monomethyl itaconate, monoethyl itaconate, monopropyl itaconate, and mono-n-butyl itaconate; an itaconic acid monocycloalkyl ester such as monocyclopentyl itaconate, monocyclohexyl itaconate, and monocycloheptyl itaconate; an itaconic acid monoalkyl cycloalkyl ester such as monomethyl cyclopentyl itaconate, and monoethyl cyclohexyl itaconate; and the like may be mentioned.

The carboxyl group-containing monomers may be used as single types alone or as a plurality of types combined. Among the carboxyl group-containing monomers, from the viewpoint of being able to make the effect of the present invention much more remarkable, the α,β-ethylenically unsaturated monocarboxylic acid monomer is preferable, acrylic acid or methacrylic acid is preferable, and methacrylic acid is more preferable.

The content of the carboxyl group-containing monomer unit in the nitrile rubber is preferably 0.1 to 20 wt %, more preferably 0.5 to 15 wt %, and still more preferably 1 to 10 wt %. By setting the content of the carboxyl group-containing monomer unit within the above-mentioned range, the compatibility (miscibility) with a thermosetting resin, the adhesiveness to the base material, and the bending fatigue resistance can be more improved.

In addition, the nitrile rubber constituting the latex used in the present invention is preferably a rubber prepared by copolymerizing an α,β-ethylenically unsaturated nitrile monomer together with a conjugated diene monomer from the viewpoint of developing rubber elasticity.

As the conjugated diene monomer, a conjugated diene monomer having 4 to 6 carbon atoms such as 1,3-butadiene, isoprene, 2,3-dimethyl-1,3-butadiene, 1,3-pentadiene, and chloroprene are preferable, 1,3-butadiene and isoprene is more preferable, and 1,3-butadiuene is particularly preferable. The conjugated diene monomers may be used as single types alone or as a plurality of types combined.

The content of the conjugated diene monomer unit in the nitrile rubber is preferably 20 to 90 wt %, more preferably 35 to 85 wt %, and still more preferably 50 to 80 wt %. By setting the content of the conjugated diene monomer unit within the above-mentioned range, it is possible to appropriately improve the rubber elasticity while the heat resistance and chemical stability are being made good. Note that the above-mentioned content of the conjugated diene monomer unit is the content including the hydrogenated part when the below-mentioned hydrogenation is performed.

In addition, the nitrile rubber constituting the latex used in the present invention may be a rubber prepared by copolymerizing an α,β-ethylenically unsaturated nitrile monomer, a carboxyl group-containing monomer, and a conjugated diene monomer, and together with another monomer used copolymerizable with these. As such another monomer, ethylene, an α-olefin monomer, an aromatic vinyl monomer, an α,β-ethylenically unsaturated carboxylic acid ester monomer (exclusive of those corresponding to the above-mentioned "carboxyl group-containing monomer"), a fluorine-containing vinyl monomer, and a copolymerizable anti-aging agent, and the like may be mentioned.

As the α-olefin monomer, an α-olefin monomer having 3 to 12 carbon atoms are preferable; for example, propylene, 1-butene, 4-methyl-1-pentene, 1-hexene, and 1-octene, and the like may be mentioned.

As the aromatic vinyl monomer, for example, styrene, α-methylstyrene, and vinylpyridine, and the like may be mentioned.

As the α,β-ethylenically unsaturated carboxylic acid ester monomer, for example, a (meth)acrylic acid ester (abbreviations for "methacrylic acid ester and acrylic acid ester," and the same shall apply hereinafter) having an alkyl group having 1 to 18 carbon atoms such as methyl acrylate, ethyl acrylate, n-butyl acrylate, n-dodecyl acrylate, methyl methacrylate, and ethyl methacrylate; a (meth)acrylic acid ester having an alkoxy alkyl group having 2 to 12 carbon atoms such as methoxymethyl acrylate, methoxyethyl acrylate, and methoxyethyl methacrylate; a (meth)acrylic acid ester having a cyanoalkyl group having 2 to 12 carbon atoms such as α-cyanoethyl acrylate, α-cyanoethyl methacrylate, and α-cyanobutyl methacrylate; a (meth)acrylic acid ester having a hydroxyalkyl group having 1 to 12 carbon atoms such as 2-hydroxyethyl acrylate, 2-hydroxypropyl acrylate, and 2-hydroxyethyl methacrylate; a (meth)acrylic acid ester having a fluoroalkyl group having 1 to 12 carbon atoms such as trifluoroethyl acrylate, and tetrafluoropropyl methacrylate; an α,β-ethylenically unsaturated dicarboxylic acid dialkyl ester such as dimethyl maleate, dimethyl fumarate, dimethyl itaconate, and diethyl itaconate; and a dialkylamino group-containing α,β-ethylenically unsaturated carboxylic acid ester such as dimethylaminomethyl acrylate, and diethylaminoethyl acrylate, and the like may be mentioned.

As the fluorine-containing vinyl monomer, for example, fluoroethyl vinyl ether, fluoropropyl vinyl ether, o-trifluoromethyl styrene, vinyl pentafluorobenzoate, difluoroethylene, tetrafluoroethylene, and the like may be mentioned.

As the copolymerizable antiaging agent, for example, N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinylbenzyloxy)aniline, N-phenyl-4-(4-vinylbenzyloxy)aniline, and the like may be mentioned.

These copolymerizable other monomers may be used as a plurality of types combined. The content of the copolymerizable other monomer unit is preferably 50 wt % or less, more preferably 30 wt % or less, and still more preferably 10 wt % or less, with respect to all the monomer units.

The iodine value of the nitrile rubber constituting the latex used in the present invention is 120 or less, preferably 60 or less, more preferably 45 or less, and still more preferably 38 or less. When the iodine value is too large, the effect due to the mixing of the isothiazoline-based compound represented by the general formula (1) and the benzisothiazoline-based compound represented by the general formula (2), in particular, the improvement effect of the heat resistance and the friction properties of the friction material to be obtained is not obtained.

The polymer Mooney viscosity ($ML_{1+4}$, 100° C.) of the nitrile rubber constituting the latex used in the present invention is preferably 10 to 200, more preferably 15 to 150, still more preferably 20 to 140, and particularly preferably 30 to 130. By setting the polymer Mooney viscosity within the above-mentioned range, it is possible to improve the processability while the mechanical properties are maintained good.

In addition, the content of the carboxyl group in the nitrile rubber constituting the latex used in the present invention, that is, the number of moles of the carboxyl group per 100 g of the nitrile rubber is preferably $5\times10^{-4}$ to $5\times10^{-1}$ ephr, more preferably $1\times10^{-3}$ to $1\times10^{-1}$ ephr, and particularly preferably $5\times10^{-3}$ to $8\times10^{-2}$ ephr. By setting the carboxyl group content of the nitrile rubber within the above-mentioned range, the adhesiveness to the base material can be made better.

In addition, the pH of the latex used in the present invention is preferably less than 12, more preferably within a range from 7.0 to 11.5, still more preferably within a range from 7.5 to 11.0, and particularly preferably within a range from 7.5 to 10.0. By setting the pH within the above-mentioned range, it is possible to make higher the compatibility (miscibility) with a thermosetting resin, and consequently, it is possible to make the friction material to be obtained more excellent in heat resistance and friction properties.

The method for producing the latex used in the present invention is not particularly limited, but the latex used in the present invention is obtained by copolymerizing the above-mentioned monomers and, if necessary, hydrogenating the carbon-carbon double bonds in the obtained copolymer. The polymerization method is not particularly limited and a known emulsion polymerization method or solution polymerization method may be used, but the emulsion polymerization method is preferable from the viewpoint of the industrial productivity. At the time of the emulsion polymerization, in addition to the emulsifier, a polymerization initiator, and a molecular weight adjuster, polymerization auxiliary materials which are usually used can be used.

The emulsifier is not particularly limited, but, for example, a nonionic emulsifier such as polyoxyethylene alkyl ether, polyoxyethylene alkyl phenol ether, polyoxyethylene alkyl ester, and polyoxyethylene sorbitan alkyl ester; an anionic emulsifier such as salt of fatty acid such as myristic acid, palmitic acid, oleic acid, and linoleic acid, alkylbenzene sulfonic acid salt such as sodium dodecylbenzenesulfonate, higher alcohol sulfuric acid ester salt, and alkyl sulfosuccinic acid salt; and a copolymerizable emulsifier such as sulfo ester of α,β-unsaturated carboxylic acid, sulfate esters of α,β-unsaturated carboxylic acid, sulfoalkylaryl ether; and the like may be mentioned. The amount of addition of the emulsifier is preferably 0.1 to 10 parts by weight and more preferably 0.5 to 5 parts by weight with respect to 100 parts by weight of the monomer used for the polymerization.

The polymerization initiator is not particularly limited so long as the polymerization initiator is a radical initiator. As the polymerization initiator, an inorganic peroxide such as potassium persulfate, sodium persulfate, ammonium persulfate, potassium perphosphate, and hydrogen peroxide; an organic peroxide such as t-butyl peroxide, cumene hydroperoxide, p-menthane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, and t-butylperoxyisobutyrate; an azo compound such as azobisisobutyronitrile, azobis-2,4-dimethylvaleronitrile, azobiscyclohexanecarbonitrile, and methyl azobisisobutyrate; and the like may be mentioned. These polymerization initiators can be used alone or as two or more types combined. As the polymerization initiator, an inorganic or organic peroxide is preferable. When a peroxide is used as a polymerization initiator, the peroxide can be used in combination with a reducing agent such as sodium bisulfite and ferrous sulfate as a redox-type polymerization initiator. The amount of addition of the polymerization initiator is preferably 0.01 to 2 parts by weight, with respect to 100 parts by weight of the monomers used for the polymerization.

The molecular weight adjuster is not particularly limited, but as the molecular weight adjuster, a mercaptan such as t-dodecyl mercaptan, n-dodecyl mercaptan, octyl mercaptan, and nonyl mercaptan; a halogenated hydrocarbon such as carbon tetrachloride, methylene chloride, and methylene bromide; a sulfur-containing compound such as tetraethylthiuram disulfide, dipentamethylenethiuram disulfide, and diisopropylxanthogen disulfide; and the like may be mentioned. These can be used alone or as two or more types combined. Among these, mercaptans are preferable, and t-dodecyl mercaptan is more preferable. The amount of use of the molecular weight adjuster is preferably 0.02 to 1.4 parts by weight, and more preferably 0.1 to 1.1 parts by weight with respect to 100 parts by weight of the monomers used for the emulsion polymerization.

In addition, as the molecular weight adjuster, from the viewpoint of being able to make the action and effect of the present invention more remarkable, among the mercaptans, the following two alkylthiol compounds may be used each alone or in combination: an alkylthiol compound having 12 to 16 carbon atoms, and having at least three tertiary or higher carbon atoms and a thiol group directly bonded to at least one tertiary carbon atom of the at least three tertiary or higher carbon atoms (hereinafter, appropriately referred to as "the first alkylthiol compound"); and an alkylthiol compound having 9 to 16 carbon atoms, other than "the first alkylthiol compound" (that is, an alkylthiol compound having 9 to 16 carbon atoms, and having less than three tertiary or higher carbon atoms, or an alkylthiol compound having 9 to 16 carbon atoms, and having three or more tertiary or higher carbon atoms, and no thiol group directly bonded to a tertiary carbon atom; hereinafter, appropriately referred to as "the second alkylthiol compound"). In addition, the amounts of use of these in the case of using these in combination are as follows: the amount of use of the first alkylthiol compound is set to be preferably 0.01 to 0.6 part by weight, and more preferably 0.02 to 0.4 part by weight, and amount of use of the second alkylthiol compound is set to be preferably 0.01 to 0.8 part by weight, and more preferably 0.1 to 0.7 part by weight, with respect to 100 parts of the monomers used in the emulsion polymerization.

For the medium of emulsion polymerization, usually water is used. The amount of the water is preferably 80 to 500 parts by weight, and more preferably 80 to 300 parts by weight, with respect to 100 parts by weight of the monomers used for the polymerization.

In the emulsion polymerization, it is possible to further use, if necessary, polymerization auxiliary materials such as a stabilizer, a dispersant, a pH adjuster, a deoxidizer, a viscosity adjuster, a pH buffer, and a particle size adjuster. When these are used, the types and the amounts used thereof are not particularly limited.

The polymerization conversion rate in the emulsion polymerization is set preferably within a range from 60 to 95%, and more preferably within a range from 75 to 93%, from the viewpoint of being able to improve the heat resistance and the friction properties of the friction material produced by using the latex to be obtained.

Further, in the present invention, for the obtained copolymer, if necessary, the hydrogenation of the copolymer (hydrogen addition to the copolymer) may be performed, to control the iodine value of the nitrile rubber so as to fall within the above-mentioned range. The hydrogenation may be performed on the basis of a known method. An oil layer hydrogenation method in which the latex of the copolymer obtained by emulsion polymerization is coagulated, and then the hydrogenation is performed in the oil layer; and an aqueous layer hydrogenation method in which the latex of the copolymer which is obtained is hydrogenated as it is, and the like may be mentioned. Note that when the hydrogenation of the copolymer is performed, as described later, from the viewpoint of being capable of performing the hydrogenation satisfactorily, the hydrogenation is performed before the isothiazoline-based compound represented by the general formula (1) and the benzisothiazoline-based compound represented by the general formula (2) are added to the latex.

In the aqueous layer hydrogenation method, the hydrogenation reaction is suitably performed by adding water to and diluting, if necessary, the latex of the copolymer prepared by the emulsion polymerization. As the aqueous layer hydrogenation method, an aqueous layer direct hydrogenation method in which the latex is hydrogenated by supplying hydrogen to the reaction system in the presence of a hydrogenation catalyst, and an aqueous layer indirect hydrogenation method in which the latex is hydrogenated by reducing the latex in the presence of an oxidizing agent, a reducing agent and an activating agent may be mentioned. Of these two methods, the aqueous layer direct hydrogenation method is preferable.

In the aqueous layer direct hydrogenation method, the concentration of the copolymer in the aqueous layer (concentration in latex state) is preferably 50 wt % or less, in order to prevent the aggregation. As the hydrogenation catalyst, a platinum group element-containing compound is used in a state of being dissolved or dispersed.

A platinum group element-containing hydrogenation catalyst is not particularly limited, so long as the platinum group element-containing hydrogenation catalyst is a water-soluble or water-dispersible platinum group element compound; specifically, as such a compound, a ruthenium compound, a rhodium compound, a palladium compound, an osmium compound, an iridium compound, a platinum compound, and the like may be mentioned. In the production method of the present invention, such a hydrogenation catalyst is not carried on a carrier, but is used for the hydrogenation reaction in a state of being dissolved or dispersed in the latex of the above-mentioned conjugated diene-based polymer. As the hydrogenation catalyst, a palladium compound or a rhodium compound is preferable, and a palladium compound is particularly preferable. In addition, two or more platinum group element compounds may also be used, but even in such a case, it is preferable to use a palladium compound as a main catalyst component.

The palladium compound is not particularly limited so long as the palladium compound is water-soluble or water-dispersible, and exhibits a hydrogenation catalytic activity;

the palladium compound is preferably a water-soluble palladium compound. Further, as the palladium compound, usually a II-valent or IV-valent palladium compound is used, and as the foam of such a palladium compound, a salt or a complex salt may be mentioned.

As the palladium compound, for example, an organic acid salt such as palladium acetate, palladium formate, and palladium propionate; an inorganic acid salt such as palladium nitrate, and palladium sulfate; a halide such as palladium fluoride, palladium chloride, palladium bromide, and palladium iodide; an inorganic palladium compound such as palladium oxide, and palladium hydroxide; an organic palladium compound such as dichloro(cyclooctadiene)palladium, dichloro(norbomadiene)palladium, and dichlorobis(triphenylphosphine)palladium; a halogenated salt such as sodium tetrachloropalladate, and ammonium hexachloropalladate; a complex salt such as potassium tetracyanopalladate; and the like may be mentioned. Among these palladium compounds, an organic acid salt or inorganic acid salt such as palladium acetate, palladium nitrate, and palladium sulfate; palladium chloride; and a halogenated salt such as sodium tetrachloropalladate, and ammonium hexachloropalladate are preferable; and palladium acetate, palladium nitrate and palladium chloride are more preferable.

In addition, as the rhodium compound, a halide such as rhodium chloride, rhodium bromide, and rhodium iodide; an inorganic acid salt such as rhodium nitrate, and rhodium sulfate; an organic acid salt such as rhodium acetate, rhodium formate, rhodium propionate, rhodium butyrate, rhodium valerate, rhodium naphthenate, and rhodium acetylacetonate; rhodium oxide; rhodium trihydroxide; and the like may be mentioned.

As the platinum group element compounds, commercially available products may be used, or alternatively, the products produced by the known methods can also be used. In addition, the method for dissolving or dispersing the platinum group element compound in the latex of a conjugated diene-based polymer is not particularly limited; as such a method, a method in which a platinum group element compound is directly added to the latex, a method in which a platinum group element compound in a state of being dissolved or dispersed in water is added to the latex, and the like may be mentioned. In the case where a platinum group element compound is dissolved or dispersed in water, by using, for example, an inorganic acid such as nitric acid, sulfuric acid, hydrochloric acid, bromic acid, perchloric acid, and phosphoric acid; a sodium salt and potassium salts of these inorganic acids; organic acids such as acetic acid; and the like in combination, the platinum group element compound is sometimes increased in the solubility in water, so it is preferable.

The amount of use of the hydrogenation catalyst may be appropriately determined, but is preferably 5 to 6000 ppm by weight, and more preferably 10 to 4000 ppm by weight, with respect to the copolymer obtained by the polymerization.

In the aqueous layer direct hydrogenation method, after the completion of the hydrogenation reaction, the platinum group element in the platinum group element compound in the latex is removed. As the method for removing the platinum group element, for example, it is possible to adopt a method in which an adsorbent such as activated carbon and an ion-exchange resin is added to the latex, the platinum group element in the platinum group compound is adsorbed to the absorbent, and then the latex is subjected to filtration or centrifugation, or a method in which the platinum group element in the platinum group element compound present in the latex is complexed with a complexing agent to form a insoluble complex, and then the latex is filtered or centrifuged. On the other hand, it is also possible not to remove the platinum group element in the platinum group element compound so as to remain in the latex. In addition, after the completion of the hydrogenation reaction, if necessary, the pH of the latex may also be adjusted by adding a pH adjuster or the like.

The latex composition obtained by the production method of the present invention further contains the isothiazoline-based compound represented by the following general formula (1) and the benzisothiazoline-based compound represented by the following general formula (2), in addition to the above-mentioned latex of the nitrile rubber.

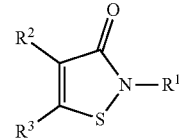
(1)

In the general formula (1), $R^1$ represents a hydrogen atom, or a substituted or unsubstituted organic group, and $R^2$ and $R^3$ each independently represent a hydrogen atom, a halogen atom, or a substituted or unsubstituted organic group. When $R^1$, $R^2$, and $R^3$ are hydrocarbon groups, $R^1$, $R^2$, and $R^3$ may each have a chain-like carbon skeleton such as a linear chain or a branched chain, a cyclic carbon skeleton, or a substituent such as a halogen atom, an alkoxyl group, a dialkylamino group, an acyl group, or an alkoxycarbonyl group. The number of the carbon atoms in the hydrocarbon group is preferably 1 to 12, more preferably 1 to 10, and particularly preferably 1 to 8. As the specific example of such a hydrocarbon group, a methyl group, an ethyl group, a propyl group, an isopropyl group, a butyl group, a hexyl group, a cyclohexyl group, an octyl group, a 2-ethylhexyl group, and the like may be mentioned.

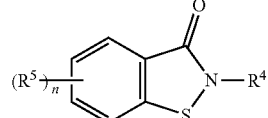
(2)

In the general formula (2), $R^4$ represents a hydrogen atom, or a substituted or unsubstituted organic group, and $R^5$ each independently represent a hydrogen atom, or a substituted or unsubstituted organic group. When $R^4$ is a hydrocarbon group, $R^4$ can be the same hydrocarbon group as described by the formula (1). In addition, when $R^5$ is an organic group, this organic group includes an aliphatic group such as an alkyl group and a cycloalkyl group, or an aromatic group; however, $R^5$ is preferably an aliphatic group. The number of the carbon atoms of the alkyl group is preferably 1 to 12, more preferably 1 to 10, and particularly preferably 1 to 8. These alkyl group and cycloalkyl group may each have a substituent such as a halogen atom, an alkoxyl group, a dialkylamino group, an acyl group, and an alkoxycarbonyl group. As the specific example of the aliphatic group, a methyl group, an ethyl group, a propyl group, an isopropyl group, a butyl group, a hexyl group, a cyclohexyl group, an octyl group, a 2-ethyl hexyl group, and the like may be mentioned. In the general formula (2), "n" represents an integer of 0 to 4.

As the specific example of the isothiazoline-based compound represented by the general formula (1), 2-methyl-4-isothiazolin-3-one, 2-n-octyl-4-isothiazolin-3-one, 4-chloro-2-n-octyl-4-isothiazolin-3-one, 5-chloro-2-methyl-4-isothiazolin-3-one, 5-chloro-2-n-octyl-4-isothiazolin-3-one, 4,5-dichloro-2-n-octyl-4-isothiazolin-3-one, and the like may be mentioned; among these, 2-methyl-4-isothiazolin-3-one is preferable from the viewpoint of being capable of enhancing the heat resistance and the friction properties when a friction material is obtained by using the latex composition.

In addition, as the specific example of the benzisothiazoline-based compound represented by the general formula (2), 1,2-benzisothiazolin-3-one, N-n-butyl-1,2-benzisothiazolin-3-one, and the like may be mentioned; among these, 1,2-benzisothiazolin-3-one is preferable from the viewpoint of being capable of enhancing the heat resistance and the friction properties when a friction material is obtained by using the latex composition.

The content of the isothiazoline-based compound represented by the general formula (1) in the latex composition is 26 ppm by weight or more, preferably 26 to 3000 ppm by weight, and more preferably 30 to 2000 ppm by weight with respect to the nitrile rubber contained in the latex (when the content of the nitrile rubber is set to be 100 wt %). When the content of the isothiazoline-based compound represented by the general formula (1) is less than 26 ppm by weight, the various members and friction material to be obtained are poor in rotting resistance, heat resistance and friction properties.

The content of the benzisothiazoline-based compound represented by the general formula (2) in the latex composition is 26 ppm by weight or more, preferably 26 to 3000 ppm by weight, and more preferably 30 to 2000 ppm by weight with respect to the nitrile rubber contained in the latex (when the content of the nitrile rubber is set to be 100 wt %). When the content of the benzisothiazoline-based compound represented by the general formula (2) is less than 26 ppm by weight, the various members and friction material to be obtained are poor in rotting resistance, heat resistance and friction properties.

Note that, in the latex composition, the ratio of the content of the isothiazoline-based compound represented by the general formula (1) to the content of the benzisothiazoline-based compound represented by the general formula (2) is, in terms of the ratio of (weight of the isothiazoline-based compound represented by general formula (1)/weight of the benzisothiazoline-based compound represented by general formula (2)), preferably 1:10 to 10:1, more preferably 1:8 to 8:1, and still more preferably 1:5 to 5:1, from the viewpoint of being capable of more enhancing the effect due to the mixing of these.

In the production method of the present invention, as a method for setting the content of the isothiazoline-based compound and the content of the benzisothiazoline-based compound within the above-mentioned ranges, there is used a method in which the isothiazoline-based compound and the benzisothiazoline-based compound are added to the latex of the nitrile rubber under the conditions that the latex of the nitrile rubber is in a state at a temperature of 50° C. or lower, the isothiazoline-based compound and the benzisothiazoline-based compound are each in a state of an aqueous solution having a concentration of 0.1 to 40 wt %, and the total addition rate of the isothiazoline-based compound and the benzisothiazoline-based compound is 2,000 ppm by weight/min or less.

According to the method for producing a latex composition of the present invention, by adding the isothiazoline-based compound and the benzisothiazoline-based compound to the latex of the nitrile rubber under the above-mentioned conditions, the generation of aggregates in the latex composition can be effectively suppressed, the rotting resistance of the latex composition itself can also be improved, additionally the rotting resistance and the heat resistance of each of the various members and the like obtained by using the aforementioned latex composition can be improved, and moreover the friction material to be obtained can be made excellent in heat resistance and friction properties.

Note that, when the isothiazoline-based compound represented by the general formula (1) and the benzisothiazoline-based compound represented by the general formula (2) are added to the latex of the nitrile rubber, (A) a method in which an aqueous solution of the isothiazoline-based compound having a concentration 0.1 to 40 wt % is added, and then an aqueous solution of the benzisothiazoline-based compound having a concentration of 0.1 to 40 wt % is added; (B) a method in which an aqueous solution of the benzisothiazoline-based compound having a concentration 0.1 to 40 wt % is added, and then an aqueous solution of the isothiazoline-based compound having a concentration of 0.1 to 40 wt % is added; (C) a method in which an aqueous solution of the isothiazoline-based compound having a concentration 0.1 to 40 wt % and an aqueous solution of the benzisothiazoline-based compound having a concentration of 0.1 to 40 wt % are simultaneously added; and (D) a method in which a composite aqueous solution of the isothiazoline-based compound and the benzisothiazoline-based compound having a total concentration of 0.1 to 40 wt % is added, may be mentioned. Any of the methods (A) to (D) may be adopted; however, the method (D) is preferable from the viewpoint of being capable of more efficiently adding the isothiazoline-based compound and the benzisothiazoline-based compound while the generation of aggregates in the latex composition is being more effectively suppressed.

The concentration of the aqueous solution containing the isothiazoline-based compound and/or the benzisothiazoline-based compound (hereinafter, sometimes referred to as "preservative aqueous solution") may be the above-mentioned concentration of 0.1 to 40 wt %, is preferably 1 to 35 wt %, and more preferably 2 to 30 wt %, in tams of the total concentration of the isothiazoline-based compound and the benzisothiazoline-based compound. When the concentration of the preservative aqueous solution is too high, the isothiazoline-based compound and the benzisothiazoline-based compound cannot satisfactorily diffuse in the obtained latex composition, moreover the aggregates having as the cores thereof the isothiazoline-based compound and the benzisothiazoline-based compound tend to be generated, consequently the effective concentrations of isothiazoline-based compound and the benzisothiazoline-based compound in the latex composition are decreased, and the effect to improve the rotting resistance is decreased. On the other hand, when the concentration of the preservative aqueous solution is too low, the addition of the isothiazoline-based compound and the benzisothiazoline-based compound needs much time to decrease the production efficiency of the latex composition, and additionally, the concentrations of the isothiazoline-based compound and the benzisothiazoline-based compound in the latex composition are decreased and consequently the effect to improve the rotting resistance is not obtained.

The temperature of the latex of the nitrile rubber during the addition of the preservative aqueous solution may be the above-mentioned temperature of 50° C. or lower, but is preferably 40° C. or lower, and more preferably 37° C. or lower. When the temperature of the latex is too high, the isothiazoline-based compound represented by the general formula (1) and the benzisothiazoline-based compound represented by the general formula (2) contained in the preservative aqueous solution are deactivated, and the effect to improve the rotting resistance of the obtained latex composition is not obtained. The lower limit of the temperature of the latex of the nitrile rubber during the addition of the preservative aqueous solution is not particularly limited, but is usually 0° C. or higher, and preferably 5° C. or higher, from the viewpoint of being capable of satisfactorily mixing the preservative aqueous solution and the latex of the nitrile rubber with each other.

The addition rate of the preservative aqueous solution may be the above-mentioned 2,000 ppm by weight/min or less, but is preferably 1,200 ppm by weight/min or less, and more preferably 1,000 ppm by weight/minor less, with respect to the nitrile rubber contained in the latex (in the case where the content of the nitrile rubber is set to be 100 wt %), in terms of the total addition rate of the isothiazoline-based compound and the benzisothiazoline-based compound. When the addition rate of the preservative aqueous solution is too high, in the obtained latex composition, aggregates having as the cores thereof the isothiazoline-based compound and the benzisothiazoline-based compound tend to be generated, consequently the effective concentrations of the isothiazoline-based compound and the benzisothiazoline-based compound in the latex composition are decreased, and the effect to improve the rotting resistance is decreased. The lower limit of the addition rate of the preservative aqueous solution is not particularly limited, but is usually 50 ppm by weight/min or more, and preferably 100 ppm by weight/min or more, from the viewpoint of being capable of more improving the production efficiency of the latex composition.

In addition, in the production method of the present invention, when the iodine value of the nitrile rubber is controlled within the above-mentioned range by the hydrogenation of the copolymer as described above, the timing for adding the preservative aqueous solution is such that the preservative aqueous solution is added to the latex of the nitrile rubber after the hydrogenation. Note that if the timing for adding the preservative aqueous solution is set at a time before the hydrogenation, in the case that the hydrogenation is performed for the copolymer in the latex, after the addition of the preservative aqueous solution, in the presence of a hydrogenation catalyst, the activity of the hydrogenation catalyst is decreased due to the action of the isothiazoline-based compound and the benzisothiazoline-based compound, and thus the hydrogenation is insufficient. Consequently, in the case where the timing for adding the preservative aqueous solution is set at a time before the hydrogenation, the amount of use of the hydrogenation catalyst is required to be increased in order to satisfactorily perform the hydrogenation. In contrast, in the production method of the present invention, by performing the addition of the preservative aqueous solution after the hydrogenation, such a decrease of the activity of the hydrogenation catalyst can be prevented, and consequently, while the amount of use of the hydrogenation catalyst is being reduced, the hydrogenation can be performed satisfactorily.

In the present invention, as described above, it is possible to produce a latex composition comprising a latex of a nitrile rubber containing an $\alpha,\beta$-ethylenically unsaturated nitrile monomer unit in a content of 8 to 60 wt %, and having an iodine value of 120 or less, an isothiazoline-based compound represented by the general formula (1) and a benzisothiazoline-based compound represented by the general formula (2), the content of the isothiazoline-based compound being 26 ppm by weight or more and the content of the benzisothiazoline-based compound being 26 ppm by weight or more, with respect to the nitrile rubber.

In addition, in the present invention, by further adding a thermosetting resin in the above-mentioned latex composition, a resin-containing latex composition is preferably prepared.

The thermosetting resin is not particularly limited so long as the thermosetting resin is a resin to be cured by heating, and from the viewpoint of being excellent in the compatibility (miscibility) with the above-mentioned latex composition of the present invention, a water-soluble thermosetting resin is preferable; for example, a phenolic resin, a urea resin, a melamine resin, an epoxy resin, and the like may be mentioned. Among these, from the viewpoint of being able to make the action and effect of the present invention more remarkable, a phenolic resin or an epoxy resin is preferable, and a phenolic resin is particularly preferable.

The epoxy resin is not particularly limited so long as the epoxy resin is a resin having an epoxy group and exhibiting a water solubility; as the epoxy resin, a bisphenol A type epoxy resin, a bisphenol AD type epoxy resin, a bisphenol F type epoxy resin, a bisphenol AF type epoxy resin, a phenol novolac type epoxy resin, a cresol novolac type epoxy resin, an $\alpha$-naphthol novolac type epoxy resin, a bisphenol A novolac type epoxy resin, and the like may be used without limitation; among these, a bisphenol A novolac type epoxy resin is preferable. Note that the epoxy resin as referred to herein includes a so-called epoxy resin precursor before becoming a curing type epoxy resin by undergoing three-dimensional cross-linking.

A curing agent may be used in the epoxy resin. The curing agent for the epoxy resin is not particularly limited, but as the curing agent, amines, acid anhydrides, imidazoles, mercaptans, phenolic resins, and the like may be mentioned.

As the phenolic resin, it is possible to use any general-purpose phenolic resins prepared by condensing phenols and aldehydes in the presence of acidic catalysts or in the presence of basic catalysts.

As the phenols used in the preparation of the phenolic resins, carbolic acid, m-cresol, p-cresol, o-cresol, p-alkyl-phenol, and the like are suitably used, and mixtures of these can also be used. In addition, as the aldehydes used in the preparation of the phenolic resins, formaldehyde, acetaldehyde, and the like are suitably used, and the mixtures of these may also be used.

In addition, as the phenolic resin, both of a resol-type phenolic resin and a novolac-type phenolic resin can be used; moreover, various modified phenolic resins can also be used, and these may also be used as blended with each other. Moreover, as the phenolic resin used, the phenolic resins may be used by being selected according to the object, with respect to the properties such as the degree of the condensation of phenols with aldehydes, the molecular weight, and the residual percentage of the residual monomer; various phenolic resins being different from each other with respect to these physical properties and having various grades are commercially available, and accordingly such commercially available phenolic resins may be appropriately used.

Note that the phenolic resin as referred to herein includes a so-called phenolic resin precursor before becoming a cured type phenolic resin by undergoing three-dimensional cross-linking. In addition, as the modified phenolic resin, the resol-type phenol resins modified with various thermoplastic polymers, or the novolac type phenol resins modified with various thermoplastic polymers may be mentioned. The thermoplastic polymer used in the modification for obtaining the modified phenolic resins is not particularly limited, but as such thermoplastic polymer, elastomers such as nitrile rubber, hydrogenated nitrile rubber, isoprene rubber, polybutadiene rubber, acrylic rubber, and ethylene acrylic rubber; polyamide resin, phenoxy resin, polyvinylbutyral resin, polyethylene terephthalate, polyurethane, methyl methacrylate-based copolymer, polyester resin, cellulose acetate polymer, polyvinyl alcohol, and the like may be mentioned.

The content of the thermosetting resin in the resin-containing latex composition is, with respect to 100 parts by weight of the nitrile rubber contained in the resin-containing latex composition, preferably 40 to 500 parts by weight, more preferably 50 to 450 parts by weight, and still more preferably 60 to 400 parts by weight. By setting the content of the thermosetting resin within the above-mentioned range, when a friction material using the resin-containing latex composition is obtained, the heat resistance and friction properties of the friction material to be obtained can be more enhanced.

In addition, the latex composition obtained by the production method of the present invention preferably further contains a friction modifier. As the friction modifier, for example, the following known modifiers are used: powders of inorganic substances such as calcium carbonate, magnesium carbonate, zinc oxide, barium sulfate, clay, talc, carbon black, graphite, alumina, mica, fluorite, zirconia, hematite, silica, antimony sulfide, iron sulfide, molybdenum sulfide, and sulfur; powders of metals such as iron, lead, and copper; powders of organic substances such as cashew dust, rubber dust, and powders of various cured resins; and calcium silicate staple fiber.

The content of the friction modifier in the latex composition is, with respect to 100 parts by weight of the nitrile rubber contained in the latex composition, preferably 10 to 1000 parts by weight, more preferably 20 to 800 parts by weight, and still more preferably 30 to 500 parts by weight. By setting the content of the friction modifier within the above-mentioned range, the friction properties can be appropriately improved.

In addition, the latex composition obtained by the production method of the present invention may further contain dispersants such as methylcellulose, carboxymethylcellulose, polyvinylpyrrolidone, polyvinyl alcohol, polyvinylmethyl ether, and polyvinylethyl ether; flexibility-promoting agents such as glycols; surfactants; and the like.

In addition, the latex composition obtained by the production method of the present invention can contain, if necessary, the following as added therein: isocyanate, blocked isocyanate, oxazoline-based compounds, carbodiimide-based compounds, maleimides, thermosetting polyimides such as bis-allyl-nadi-imide, ethylene urea, 2,6-bis (2,4-dihydroxyphenylmethyl)-4-chlorophenol, various phenols-formaldehydes condensates (for example, resorcin-formaldehyde condensate, monohydroxybenzene-formaldehyde condensate, chlorophenol-formaldehyde condensate, resorcin-monohydroxybenzene-formaldehyde condensate, resorcin-chlorophenol-formaldehyde condensate, and modified resorcin-formalin resin such as a mixture composed of a condensate of sulfur monochloride and resorcin and resorcin formalin condensate), polyepoxide, modified polyvinyl chloride, carbon black, carbon nanotube, silane coupling agent, adhesive aid, alkylpyrridinium halides, bisulfates, charge adding agents such as distearyldimethyl ammonium methyl sulfate, release agents such as waxes, processing adis such as stearic acid, silica, silicate, clay, bentonite, vermiculite, nontronite, beidelite, volkonskoite, hectorite, saponite, laponite, sauconite, layered polysilicate (magadiite), kenyaite, ledikite, plaster, alumina, titanium dioxide, talc and the like, fillers such as particles of inorganic substances such as the mixtures of these, binders such as starch, stabilizers such as polyvinlylpyrrolidone, plasticizer, cross-linking agent, vulcanizing agent, vulcanization accelerator, co-cross-linking agent, zinc oxide, unsaturated carboxylic acid metal salt, triazine thiols, water absorbent, colorants such as inorganic pigment and organic pigment, chelating agent, dispersant, antioxidant, ultraviolet absorber, surfactant, compression recovery agent, antifoaming agent, bactericide, wetting agent, tack preventing agent, foaming agent, foam stabilizer, penetrant, water-repellent/oil repellent, antiblocking agent, formalin catcher, flame retardant, thickening agent, softener, antiaging agent, oil, ozone deterioration preventing agent, suspension aid, condensation retarder, fluid loss agent, water resistant additive, lubricant, and the like.

As the cross-linking agent, organic peroxide cross-linking agents, polyamine cross-linking agents, and the like may be mentioned.

The co-cross-linking agent is not particularly limited, but is preferably a low molecular weight or high molecular weight compound having a plurality of radically reactive unsaturated groups in the molecule. For example, polyfunctional vinyl compounds such as divinylbenzene and divinylnaphthalene; isocyanurates such as triallyl isocyanurate and trimethallyl isocyanurate; cyanurates such as triallylcyanurate; maleimides such as N,N'-m-phenylenedimaleimide and diphenylmethane-4,4'-bismaleimide; allyl esters of polyvalent acids such as diallyl phthalate, diallyl isophthalate, diallyl maleate, diallyl fumarate, diallyl sebacate, and triallyl phosphate; diethylene glycol bisallyl carbonate; allyl ethers such as ethylene glycol diallyl ether, triallyl ether of trimethylol propane, and partial allyl ether of pentaerythrit; allyl-modified resins such as allylated novolac resin and allylated resol resin; and 3 to 5-functional methacrylate compounds and acrylate compounds such as trimethylolpropane trimethacrylate and trimethylolpropane triacrylate; and the like may be mentioned. These may be used as single types or a plurality of types combined.

The latex composition obtained by the production method of the present invention may be blended with various latexes. As the latex to be blended with, acrylonitrile butadiene rubber latex, styrene acrylonitrile butadiene copolymer latex, acrylonitrile butadiene vinylpyridine copolymer latex, styrene butadiene copolymer latex, styrene butadiene vinylpyridine copolymer latex, polybutadiene rubber latex, chloroprene rubber latex, chlorosulfonated polyethylene latex, natural rubber latex, polyisoprene rubber latex, emulsion of epichlorohydrin, emulsion of epichlorohydrin-polyether copolymer, emulsion of styrene-isoprene-styrene block copolymer, fluororubber latex, ethylene-propylene-diene copolymer latex (emulsion), acrylic acid ester copolymer latex, polyvinyl chloride emulsion, ethylene-vinyl acetate copolymer latex (emulsion), and the like may be mentioned.

As the method for allowing the latex composition of the present invention to contain a thermosetting resin and the like, it is possible to use, for example, a method in which in the above-mentioned latex composition, the thermosetting resin is mixed. In this case, the thermosetting resin may be mixed as it is, or alternatively, the thermosetting resin may be dissolved or dispersed in water, and may be mixed in a state of a solution or dispersion.

The latex composition obtained by the production method of the present invention preferably has a pH of less than 12, more preferably within a range from 7.0 to 11.5, still more preferably within a range from 7.5 to 11.0, and particularly preferably within a range from 7.5 to 10.0. By setting the pH of the latex composition within the above-mentioned range, the rotting resistance of the latex composition itself is more improved, and moreover, the rotting resistance, heat resistance and friction properties of each of the various members and friction material to be obtained are more improved.

The method for regulating the pH of the latex composition within the above-mentioned range is not particularly limited, but for example, it is possible to use a method in which the pH of the latex of the nitrile rubber constituting the latex composition is preliminarily regulated by using a pH adjuster. In addition, a method in which the type and the amount of use of the emulsifier used at the time of emulsion polymerization are regulated, a method in which the type and the amount of use of the adjuster such as the polymerization initiator or the polymerization terminator used in the copolymerization of the above-mentioned monomers are regulated, a method in which the type and the amount of use of the emulsifier added for the post-stabilization for suppressing the aggregation (self-coagulation) between the latex particles are regulated, a method in which the type and the amount of use of the adjuster for the hydrogenation catalyst used during performing the hydrogenation of the copolymer (the pH adjuster and the like when the hydrogenation catalyst is used in a form of an aqueous solution) are regulated, a method in which the type and the addition amount of the additive such as a salt which is mixed accordance with need, for the purpose of decreasing the viscosity of the latex or for the purpose of regulating the pH as the pH adjuster and the like are regulated, and like may be mentioned.

Friction Material

The method for producing a friction material of the present invention comprises a step of making the above-mentioned resin-containing latex composition attached to or mixed with the base material.

The base material is not particularly limited, and usually a fiber base material are used as the base material. As the fiber base material, inorganic fibers or, organic fibers made of copper, stainless steel, brass, aramid, carbon, glass, potassium titanate, rock wool, ceramic and the like may be mentioned.

The method for producing the friction material of the present invention is not particularly limited, but the friction material of the present invention can be produced, for example, by immersing a base material in the above-mentioned resin-containing latex composition, by thus attaching the resin-containing latex composition to the surface of the base material, and by drying the thus treated base material, if necessary. In addition, in this case, after performing the drying, if necessary, heating may also be performed, in order to promote the curing of the thermosetting resin contained in the resin-containing latex composition. The heating temperature for the curing may be appropriately selected according to the type of the thermosetting resin used, but is usually 120 to 240° C., and the heating time is usually 30 minutes to 8 hours.

The friction material of the present invention is one obtained by using the above-mentioned resin-containing latex composition, and accordingly is excellent in heat resistance and friction properties. Consequently, by taking advantage of such properties, the friction material of the present invention is suitable for various friction materials such as brake lining, disc pad, clutch facing and the like for automobiles and industrial machines.

Note that, in the above-mentioned examples, an example in which the latex composition obtained by the production method of the present invention is mixed with a thermosetting resin to produce a resin-containing latex composition, and a friction material is produced by using the obtained resin-containing latex composition; however, the latex composition of the present invention is excellent in chemical stability and thermal stability, and excellent in the heat resistances of various members and the like in the applications which are obtained using the latex composition of the present invention, and accordingly, the latex composition of the present invention can be suitably used not only in such friction materials but also in a wide variety of applications to materials other than friction materials.

For examples, the latex composition obtained by the production method of the present invention is suitably used in the following wide range of applications: raw materials for nonwoven fabrics widely used as clothing such as clothing interlining, kimono interlining, and underwear, industrial materials such as filters, polishing cloth, and heat insulator, hygienic goods such as masks, gauze, white coats, automobile interior materials and filter for air conditioning; dip molding compositions for dip molding nipple, air ball, glove, balloon, sack and the like; latex adhesives for enhancing the adhesive force between the base material woven fabric and the rubber member in toothed belt (timing belts for automobiles and general industries, timing belts in oil, oil pump belts and the like), poly-ribbed belt, lapped belt, V belt and the like; adhesives used for various fibers for reinforcing rubber (tire cord, twisted cord such as core wire, reinforcing threads for rubber hose, short fiber, foundation cloth for diaphragm); fiber treatment agents (As fibers, polyamide fibers including aliphatic polyamides such as nylon and aromatic polyamide such as aramide, polyester fiber, carbon fiber, glass fiber, cotton fiber, basalt fiber, and the like may be mentioned. Fibers may be used as single types alone or in combinations.); binders such as battery binder, fuel cell binder, paper coating binder, cement mixing agent, internal additive impregnating binder, and coating binder for ink-jet recording medium; papermaking; paper coating composition; resin modifying composition; foam rubbers (rubber foams) used for mattress, puff, roll, impact absorber, and the like; joint sheet, AL sheet (adsorption sheet using no paste), sheet material and sealing material such as gasket; coating material; and the like.

EXAMPLES

Hereinafter, the present invention is described by way of more detailed Examples, but the present invention is not limited these Examples. Note that hereinafter, "parts" are based on weight unless otherwise specified. In addition, measurements and evaluations were performed as follows.

Iodine Value

The iodine value of the nitrile rubber was measured in accordance with JIS K 6235.

Content of Carboxyl Group

The content of the carboxyl group was determined as follows: to 0.2 g of a 2-mm square piece of a nitrile rubber, 100 ml of 2-butanone was added and stirred for 16 hours, and then 20 ml of ethanol and 10 ml of water were added. While stirring, a titration was performed at room temperature by using a 0.02N hydrous ethanol solution of potassium hydroxide, and thymolphthalein as an indicator, and thus the content of the carboxyl group was determined as the number of moles of the carboxyl group in 100 g of the nitrile rubber (units: ephr). Moreover, the determined number of moles of the carboxyl group was converted into the content of the methacrylic acid unit in the nitrile rubber, and thus the content of the methacrylic acid unit in the nitrile rubber was calculated.

Content of Acrylonitrile Unit

The content of the acrylonitrile unit was calculated by measuring the nitrogen content in the nitrile rubber by the Kjeldahl method in accordance with JIS K6384.

Measurement of Content of Butadiene Unit

The contents of the butadiene units (1,3-butadiene unit and saturated butadiene unit) were calculated by measuring the iodine values (according to JIS K 6235) of the nitrile rubber before the hydrogenation reaction and after the hydrogenation reaction.

Number of Fungi

In the latex of the nitrile rubber, a culture medium for detection of fungi (trade name "Easicult TCC," manufactured by Orion Diagnostica Inc.) was immersed, after each of an elapsed time of 5 days and 180 days in an environment at a temperature of 22° C., the number of the colonies generated in the culture medium for detection of fungi was observed, and the number of colonies per 1 ml of the latex was counted (units: CFU/ml).

Occurrence or Nonoccurrence of Generation of Aggregates in Latex Composition

For an obtained latex composition, the occurrence/nonoccurrence of the generation of aggregates was visually examined.

Example 1

In a reactor, 180 parts of ion exchanged water, 25 parts of an aqueous solution of sodium dodecylbenzenesulfonate having a concentration of 10 wt %, 34 parts of acrylonitrile, 4 parts of methacrylic acid, and 0.48 part of t-dodecyl mercaptan (molecular weight adjuster) were charged in the mentioned order, the gas inside the reactor was replaced with nitrogen three times, and then 62 parts of 1,3-butadiene was charged in the reactor. The reactor was held at 5° C., 0.1 part of cumene hydroperoxide (polymerization initiator), suitable amounts of a reducing agent and a chelating agent were charged in the reactor, and the polymerization reaction was continued for approximately 16 hours while the reaction mixture was being stirred. Next, 0.1 part of an aqueous solution of hydroquinone (polymerization terminator) having a concentration of 10 wt % was added to terminate the polymerization reaction at a polymerization conversion rate of 85%, then the residual monomers were removed by using a rotary evaporator at a water temperature of 60° C., and then the reaction mixture was concentrated to obtain a latex of a nitrile rubber (solid content concentration: approximately 30 wt %). The contents of the respective monomer units constituting the nitrile rubber in the latex were 34 wt % for the acrylonitrile unit, 4 wt % for methacrylic acid unit, and 62 wt % for the 1,3-butadiene unit.

Then, in an autoclave, the latex, a palladium catalyst aqueous solution (a palladium catalyst acidic aqueous solution prepared by adding nitric acid of 5-fold molar equivalent of palladium), and appropriate amounts of an alkaline soap were added in such a way that content of palladium was 2000 ppm by weight with respect to the dry weight of the nitrile rubber contained in the latex, moreover polyvinylpyrrolidone having a weight average molecular weight of 5,000 was added in a molar quantity five times the molar quantity of palladium, and nitrogen gas was flown for 10 minutes to remove the dissolve oxygen in the latex. Next, a hydrogenation reaction was performed under the conditions of a hydrogen pressure of 3 MPa, a temperature of 50° C., and a reaction time of 6 hours, and thus a nitrile rubber hydrogenation reaction mixture in a latex state was obtained. Then, an oxidation treatment was performed by adding a 30% hydrogen peroxide solution in the obtained nitrile rubber hydrogenation reaction mixture in a latex state, and by stirring the reaction mixture at 80° C. for 2 hours. Next, the pH of the nitrile rubber hydrogenation reaction mixture in a latex state subjected to an oxidation treatment was regulated, dimethylglyoxime corresponding to 5-fold molar quantity of the palladium contained in the palladium catalyst aqueous solution was added as it was in a powder form, the resulting reaction mixture was heated to 80° C. and stirred for 5 hours, and consequently an insoluble substance was precipitated in the latex; the insoluble substance was removed by filtration, and thus a latex of a nitrile rubber (a-1) was obtained. Note that the iodine value of the nitrile rubber (a-1) in the latex was found to be 32.

On the other hand, 2-methyl-4-isothiazolin-3-one (MIT) as the isothiazoline-based compound represented by the general formula (1) and 1,2-benzisothiazolin-3-one (BIT) as the benzisothiazoline-based compound represented by the general formula (2) were dissolved in water so as to satisfy a weight ratio of 1:1, and thus a preservative aqueous solution having a total concentration of MIT and BIT of 5 wt % was prepared.

Next, the latex of the nitrile rubber after the hydrogenation reaction was regulated at a temperature of 30° C., the preservative aqueous solution was added to the latex of the nitrile rubber and stirred, and thus a latex composition of the nitrile rubber was obtained. In this case, the addition rate of the preservative aqueous solution was controlled to an addition rate giving a total addition amount of MIT and BIT per 1 minute of 500 ppm by weight/min with respect to the nitrile rubber in the latex. The composition and the pH of the obtained latex composition of the nitrile rubber are shown in Table 1. The carboxyl group content of the nitrile rubber in the obtained latex composition of the nitrile rubber was found to be $4 \times 10^{-2}$ ephr. For the obtained latex composition of the nitrile rubber, according to the above-mentioned methods, the measurement of the number of fungi and the evaluation of the occurrence/nonoccurrence of the generation of aggregates was evaluated. The results thus obtained are shown in Table 1.

Example 2

A latex composition was obtained in the same manner as in Example 1 except that the temperature of the latex at the time of the addition of the preservative aqueous solution to the latex was altered from 30° C. to 40° C., and moreover the addition rate of the preservative aqueous solution was altered from 500 ppm by weight/min to 1,000 ppm by weight/min; and the measurements and the evaluations were performed in the same manner as in Example 1. The results thus obtained are shown in Table 1.

Example 3

A latex composition was obtained in the same manner as in Example 1 except that the concentration of the preservative aqueous solution was altered from 5 wt % to 10 wt % in terms of the total concentration of MIT and BIT, and moreover the temperature of the latex at the time of the addition of the preservative aqueous solution to the latex was altered from 30° C. to 35° C.; and the measurements and the evaluations were performed in the same manner as in Example 1. The results thus obtained are shown in Table 1.

Example 4

A latex composition was obtained in the same manner as in Example 1 except that the concentration of the preservative aqueous solution was altered from 5 wt % to 20 wt % in terms of the total concentration of MIT and BIT, the temperature of the latex at the time of the addition of the preservative aqueous solution to the latex was altered from 30° C. to 25° C., and moreover the addition rate of the preservative aqueous solution was altered from 500 ppm by weight/min to 700 ppm by weight/min; and the measurements and the evaluations were performed in the same manner as in Example 1. The results thus obtained are shown in Table 1.

Comparative Example 1

First, a latex of a nitrile rubber was prepared in the same manner as in Example 1. Next, to the prepared latex of the nitrile rubber, the preservative aqueous solution used in Example 1 was added, and thus a latex composition of the nitrile rubber was obtained. Note that when the preservative aqueous solution was added, the temperature of the latex was set to be 30° C., and the addition rate of the preservative aqueous solution was set to be 500 ppm by weight/min.

Next, for the nitrile rubber contained in the latex composition, a hydrogenation reaction was performed in the same manner as in Example 1, then the insoluble substance was precipitated in the latex, the insoluble substance was removed by filtration, and thus a latex composition of a nitrile rubber (a'-2) was obtained. Note that the iodine value of the nitrile rubber (a'-2) in the latex was 170. From this result, it is conceivable that the iodine value of the nitrile rubber in the latex, in the aforementioned latex of the nitrile rubber before performing the hydrogenation reaction was at least a larger value than the above-mentioned value of 170, because the iodine value of the nitrile rubber in the aforementioned latex should be a larger value than the iodine value of the nitrile rubber (a'-2) in the latex having passed through the hydrogenation. In addition, for the latex composition of the nitrile rubber (a'-2), the measurements and the evaluations were pertained in the same manner as in Example 1. The results thus obtained are shown in Table 1.

Comparative Example 2

A latex composition was obtained in the same manner as in Example 2 except that the addition rate of the preservative aqueous solution was altered from 1,000 ppm by weight/min to 3,000 ppm by weight/min; and the measurements and evaluations were performed in the same manner as in Example 2. The results thus obtained are shown in Table 1.

Comparative Example 3

A latex composition was obtained in the same manner as in Example 3 except that the concentration of the preservative aqueous solution was altered from 10 wt % to 50 wt % in tams of the total concentration of MIT and BIT; and the measurements and evaluations were performed in the same manner as in Example 3. The results thus obtained are shown in Table 1.

Comparative Example 4

A latex composition was obtained in the same manner as in Example 4 except that the temperature of the latex at the time of the addition of the preservative aqueous solution to the latex was altered from 25° C. to 80° C.; and the measurements and evaluations were performed in the same manner as in Example 4. The results thus obtained are shown in Table 1.

[Table 1]

TABLE 1

| | | Examples | | | | Comparative Examples | | | |
|---|---|---|---|---|---|---|---|---|---|
| | | 1 | 2 | 3 | 4 | 1 | 2 | 3 | 4 |
| Latex composition | | | | | | | | | |
| Highly saturated nitrile rubber (a-1) (acrylonitrile unit: 34 wt %, carboxyl group content: 0.04 ephr, iodine value: 32) | (parts) | 100 | 100 | 100 | 100 | | 100 | 100 | 100 |
| Nitrile rubber (a'-2) (acrylonitrile unit: 34 wt %, carboxyl group content: 0.04 ephr, iodine value: 170) | (parts) | | | | | 100 | | | |
| 2-Methyl-4-isothiazolin-3-one (MIT) | (ppm by weight) | 40 | 40 | 40 | 40 | 40 | 40 | 40 | 40 |
| 1,2-Bnezisothiazolin-3-one (BIT) | (ppm by weight) | 40 | 40 | 40 | 40 | 40 | 40 | 40 | 40 |
| pH | | 8 | 8 | 8 | 8 | 8 | 8 | 8 | 8 |
| Addition conditions of preservative aqueous solution | | | | | | | | | |
| Addition timing of preservative aqueous solution | | After hydrogenation | After hydrogenation | After hydrogenation | After hydrogenation | Before hydrogenation | After hydrogenation | After hydrogenation | After hydrogenation |
| Concentration of preservative aqueous solution*[1] | (wt %) | 5 | 5 | 10 | 20 | 5 | 5 | 50 | 20 |

TABLE 1-continued

|  |  | Examples | | | | Comparative Examples | | | |
|---|---|---|---|---|---|---|---|---|---|
|  |  | 1 | 2 | 3 | 4 | 1 | 2 | 3 | 4 |
| Addition rate of preservative aqueous solution*[2)] | (ppm by weight/min) | 500 | 1,000 | 500 | 700 | 500 | 3,000 | 500 | 700 |
| Temperature of latex | (° C.) | 30 | 40 | 35 | 25 | 30 | 40 | 35 | 80 |
| Evaluations |  |  |  |  |  |  |  |  |  |
| Storage stability |  |  |  |  |  |  |  |  |  |
| Number of fungi (after elapsed days of 5) | (CFU/ml) | <Detection lower limit | <Detection lower limit | <Detection lower limit | <Detection lower limit | <Detection lower limit | <Detection lower limit | <Detection lower limit | <Detection lower limit |
| Number of fungi (after elapsed days of 180) | (CFU/ml) | <Detection lower limit | <Detection lower limit | <Detection lower limit | <Detection lower limit | 82 | 107 or more | 107 or more | 107 or more |
| Occurrence of aggregates in latex composition |  | Not found | Not found | Not found | Not found | Not found | Found | Found | Found |

*[1)]Total concentration of MIT and BIT in preservative aqueous solution
*[2)]Total addition amount (ppm by weight) of MIT and BIT per 1 minute, with respect to solid content (rubber component) in latex As shown in Table 1, the latex compositions obtained by adding, to the latex of a nitrile rubber containing an α,β-ethylenically unsaturated nitrile monomer unit in a content of 8 to 60 wt %, and having an iodine value of 120 or less, under the specific conditions of the present invention, BIT as the isothiazoline-based compound represented by the general formula (1), and MIT as the benzisothiazoline-based compound represented by the general formula (2) were less than the detection lower limit with respect to the numbers of fungi after an elapsed time of 5 days and after an elapsed time of 180 days; and thus, these latex compositions were verified to be suppressed in the proliferation of fungi and excellent in rotting resistance even when used in a high-temperature environment (Examples 1 to 5). In addition, in each of Examples 1 to 5, no generation of aggregates in the latex composition was identified. Consequently, it is conceivable that in Examples 1 to 5, the generation of aggregates having as the cores thereof BIT and MIT effectively acted as preservatives.

On the other hand, in the case where BIT and MIT were added to the latex before performing the hydrogenation reaction (That is, in the case where BIT and MIT were added to the latex of the nitrile rubber having an iodine value larger than 120), the obtained latex composition was insufficient in hydrogenation and high in the iodine value of the nitrile rubber, and moreover, after an elapsed time of 180 days, underwent the increase of the number of fungi and was poor in rotting resistance (Comparative Example 1).

In addition, in each of the case where the addition rate of the preservative aqueous solution containing BIT and MIT was too high, in the case where the concentrations of BIT and MIT in the preservative aqueous solution were too high, and in the case where temperature of the latex was too high at the time of the addition of the preservative aqueous solution, the obtained latex composition underwent the increase of the number of fungi after an elapsed time of 180 days, and was poor in rotting resistance (Comparative Examples 2 to 4). Moreover, in each of Comparative Examples 2 to 4, the generation of aggregates was identified in the latex composition. Consequently, it is conceivable that in Comparative Examples 2 to 4, BIT and MIT were incorporated into the aggregates, and consequently the actions of BIT and MIT as preservatives were made insufficient.

The invention claimed is:

1. A method for producing a latex composition comprising a latex of a nitrile rubber containing an α,β-ethylenically unsaturated nitrile monomer unit in a content of 8 to 60 wt %, and having an iodine value of 120 or less, an isothiazoline-based compound represented by the following general formula (1) and a benzisothiazoline-based compound represented by the following general formula (2), the content of the isothiazoline-based compound being 26 ppm by weight or more and the content of the benzisothiazoline-based compound being 26 ppm by weight or more, with respect to the nitrile rubber,
  wherein the method comprises an addition step of adding the isothiazoline-based compound and the benzisothiazoline-based compound being each in a state of an aqueous solution having a concentration of 0.1 to 40 wt % to the latex of the nitrile rubber under the condition that the latex of the nitrile rubber is in a state at a temperature of 50° C. or lower, and
  the isothiazoline-based compound and the benzisothiazoline-based compound are added in such a way that the addition rate in the addition step is 2,000 ppm by weight/min or less in terms of the total addition rate of the isothiazoline-based compound and the benzisothiazoline-based compound,

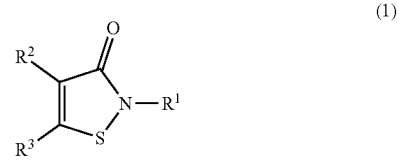

(1)

wherein, in the general formula (1), $R^1$ represents a hydrogen atom, or a substituted or unsubstituted organic group, and $R^2$ and $R^3$ each independently represent a hydrogen atom, a halogen atom, or a substituted or unsubstituted organic group;

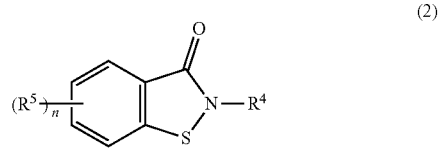

(2)

wherein, in the general formula (2), $R^4$ represents a hydrogen atom, or a substituted or unsubstituted organic group, $R^5$ each independently represent a hydrogen atom, or a substituted or unsubstituted organic group, and "n" represents an integer of 0 to 4.

2. The method for producing a latex composition according to claim 1, wherein in the addition step, the isothiazoline-based compound and the benzisothiazoline-based compound are added in a state of a composite aqueous solution having a total concentration of the isothiazoline-based compound and the benzisothiazoline-based compound of 0.1 to 40 wt % to the latex of the nitrile rubber.

3. The method for producing a latex composition according to claim 1, wherein the pH of the latex of the nitrile rubber is less than 12.

4. The method for producing a latex composition according to claim 1, wherein the nitrile rubber contains a carboxyl group-containing monomer unit.

5. A method for producing a nitrile rubber composition, comprising a step of coagulating the latex composition obtained by the method according to claim 1.

6. A method for producing a resin-containing latex composition, comprising a step of mixing the latex composition obtained by the method according to claim 1, and a thermosetting resin with each other.

7. A method for producing a friction material, comprising a step of making the resin-containing latex composition obtained by the method according to claim 6 attached to or mixed with a base material.

* * * * *